Figure 1:
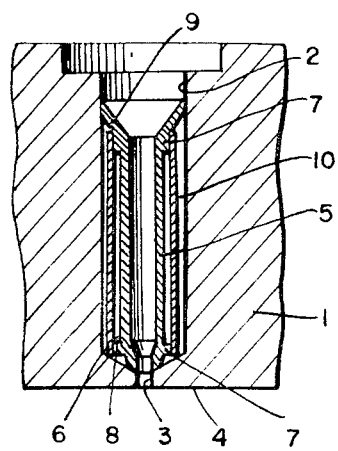

United States Patent [19]
Remscheid et al.

[11] 3,749,536
[45] July 31, 1973

[54] EXTRUSION DIE FOR UNDERWATER GRANULATOR

[75] Inventors: Horst Pawel Remscheid, Friedrich Ruppel, both of Wuppertal-Langerfeld, Germany

[73] Assignee: Barmag Barmer Maschinenfabrik Aktiengesellschaft, Wuppertal, Germany

[22] Filed: Dec. 28, 1971

[21] Appl. No.: 212,947

[30] Foreign Application Priority Data
Dec. 28, 1970 Germany............G 70 47 959.3

[52] U.S. Cl.................. 425/190, 425/379, 425/464
[51] Int. Cl................................................ B29c 1/00
[58] Field of Search.................... 425/6–10, 461, 463, 464, 467, 379, 190

[56] References Cited
UNITED STATES PATENTS
3,599,286  8/1971  Karet .................................. 425/464
3,600,748  8/1971  Faehndrich ......................... 425/379
3,452,394  7/1969  McNeal ............................... 425/379
3,174,183  3/1965  Siegel................................... 425/461
3,038,420  6/1962  Immohr ............................... 425/463
3,114,169  12/1963  Palmer................................. 425/464

Primary Examiner—J. Spencer Overholser
Assistant Examiner—Ben D. Tobor
Attorney—John H. Shurtleff

[57] ABSTRACT

An extrusion die for an underwater granulator having a nozzle plate at the face end of the die containing extrusion nozzle bores used for conducting and extruding a hot molten thermoplastic polymer into a cooling medium such as water where the extruded material immediately solidifies and is granulated by a cutter arranged close to the die face, each nozzle bore being provided with at least two axially fixed tubular liners in concentric and radially spaced positions, the innermost liner being a metal tube, and heat insulating means located between at least the outermost tubular liner and the wall of each nozzle bore.

17 Claims, 5 Drawing Figures

EXTRUSION DIE FOR UNDERWATER GRANULATOR

This invention represents a specific improvement in the construction of the extrusion die of a so-called underwater granulator which is commonly employed to extrude a molten thermoplastic polymer in the form of continuous shaped strands or the like from the face of the die into a cooling medium, usually a water bath or at least a stream or spray of water or other cooling fluid which wets the face of the die. Cutting means, for example in the form of one or more rotating knives, are usually mounted so that the knife blade sweeps across the face of the die, thereby cutting or slicing the extruded and cooled polymer strands into more or less uniform granules or pellets. The invention involves a specific improvement in the construction of the extrusion die itself and especially the bore construction in the nozzle plate as a means of providing a more useful and serviceable granulator. Underwater granulators are generally described and illustrated in detail in such references as U.S. Pat. Nos. 3,349,433 and 3,353,213 which are therefore incorporated herein by reference to avoid undue repetition.

In order to prevent a plugging or even temporary stoppage of the nozzle bores due to an undesirable cooling of the hot molten thermoplastic material flowing therethrough caused by the cooling effect of the water bath or other cooling medium in contact with the die face, it is possible to very intensively heat the nozzle bores or at least a distributor block or feed portion of these nozzle bores in fluid connection with the outlet openings or extrusion orifices in the nozzle plate. The applied heating is accomplished in such a manner as to be effective in maintaining the thermoplastic material in its fluid molten state all the way to the face of the die or nozzle plate. This is of course essential to avoid any obstruction of the individual nozzle cross-sections which might cause serious interruptions in operation over a period of time.

In addition to such a careful heating of the nozzle plate or its feed bores up to approximately the cooled die face on the nozzle plate, it has also been recommended that special means be provided to thermally insulate at least a portion of the length of the bores in the nozzle plate. In this manner, it is possible to avoid any direct heating of the nozzle plate itself, i.e. sufficient heat being provided by the preceding distributor block or the like. An adequate heat insulation of the nozzle bores has been achieved only when each bore is equipped with a lining composed of a material having a very low value of heat conductivity, e.g. a coefficient of thermal conductivity of not more than 15 kcal./m.hr.°C. Moreover, the liner must have a very high melting point of at least 750°C. and preferably 1250°C. or more. The only suitable materials for this purpose are quartz, glass and various ceramic substances, especially when working at very high extrusion temperatures of a synthetic thermoplastic polymer. The liner is preferably in the form of an interchangeable tube composed of the required materials.

Further refinements of these embodiments of an extruder for underwater granulators are also known wherein, for example, only the feed or supply portion of the nozzle bores are lined with such materials having low values of heat conductivity while relatively short outlet ends of the nozzle bores remain unlined. In all cases, however, the linings of glass, ceramic materials or the like either fit fully onto the walls of the nozzle bores or else the single liner may have projections or an intermediate member so as to assume a fixed position both axially and radially in the bore or possibly with some slight radial play sufficient to interchange individual liners.

In the latter type of devices which do not require any additional heating of the nozzle plate, the thermoplastic melt is heated to a sufficiently high temperature before passing through the bores of the nozzle plate so as to prevent any hardening or solidification in the nozzle cross-section, i.e. so that the melt will flow smoothly at all times through the bore and the outlet orifice at the face of the die under conventional extrusion pressures. At the same time, however, the melt must have a temperature which permits rapid cooling at the face of the die so as to properly solidify or at least congeal the extruded strand sufficiently to permit even cutting and the formation of a high quality and uniform granulate. At the same time, one must avoid a sticky or relatively flowable extruded material which tends to run into and/or adhere with the strands of adjacent nozzle bores.

In attempting to operate the known granulating device having an extruder die equipped with nozzle bores lined with quary, ceramic or similar tubular members, it has been difficult to achieve reliable results under critical operating conditions. Because of the brittleness of such construction materials, especially during cleaning, they tend to crack and on occasion will even shatter so as to cause a severe problem. Also, one must avoid rapid changes in temperature or large fluctuations in operating conditions which may tend to damage the known liners, again causing cracking and/or displacement from their essential position in the nozzle bore.

One object of the present invention is to avoid the disadvantages commonly encountered in known extrusion dies of underwater granulators and to substantially improve the operational reliability of such granulators under all operating conditions and especially those critical conditions involving high temperatures and pressures in the die coupled with a low temperature cooling medium on the extrusion face of the die. It is further an object of the invention to provide a liner for the nozzle bores of the extrusion die which is especially resistant to pressure, temperature changes, impact and abrasion as well as providing good heat insulation and preventing plugging or clogging of the bores.

It has now been found, in accordance with the invention, that a highly desirable improvement in the extrusion die of an underwater granulator by providing a specific liner construction or combination for each of the elongated extrusion nozzle bores which are contained in the nozzle plate and which are used for conducting a hot molten thermoplastic material to be extruded at the die face into a cooling liquid and to be granulated by cutting means arranged close to the die face. This liner combination essentially comprises at least two concentrical tubular liners mounted within each of the nozzle bores and arranged in a fixed axial position with radial clearance between each other and the wall of the nozzle bore, at least the innermost of said liners being a metal tube, and heat insulating means enclosed between at least the outermost tubular liner and the wall of each nozzle bore.

Figure 2:
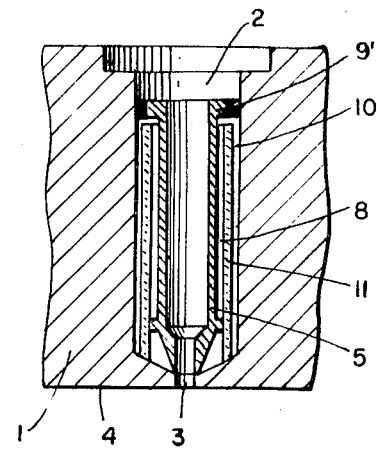
Figure 3:
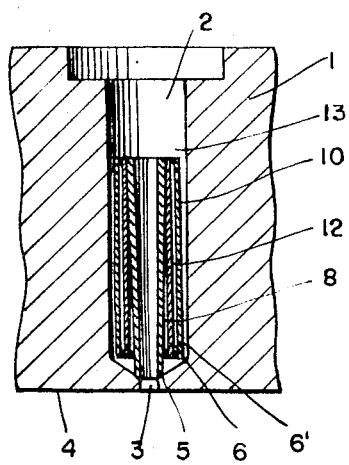
Figure 4A:
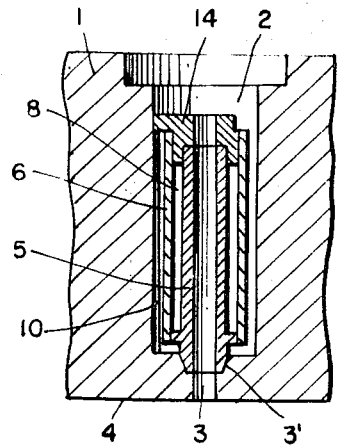
Figure 4B:
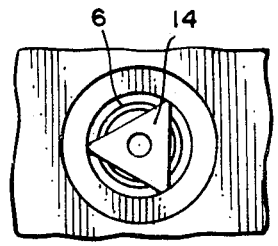

Various objects and advantages of the invention will become more apparent upon consideration of the following detailed specification taken in conjunction with the accompanying drawing wherein:

FIGS. 1, 2, 3 and 4a are cross-sectional views of a nozzle plate illustrating a number of different preferred embodiments of the invention in the form of multi-tube liners; and FIG. 4b is a top plan view of the embodiment shown in FIG. 4a to illustrate a triangular supporting member located in the upper or feed portion of the nozzle bore.

In general, the nozzle plate 1 of the extrusion die in an otherwise conventional underwater granulator has a large number of individual nozzle bores 2, only one being illustrated in each embodiment of the drawing for reasons of convenience. This nozzle plate can be wholly or partially heated, e.g. by electrical resistance heating, heat transfer fluids such as steam or another suitable heating means. Preferably, however, the nozzle plate itself remains unheated except to the extent that it receives heat from the hot molten thermoplastic polymer flowing through the nozzle bores (which should be minimal) or to the extent that heat is permitted to flow from an upper adjacent distributor plate or heating block (not shown) in direct fluid communication with the bore 2 through at least one distributor channel. These and other variations in the general construction of the extrusion die are conventional and all such dies are quite compatible with the specific liner improvement of this invention.

The extrusion outlet or end portion 3 of the nozzle bore 2 at the face of the die, i.e. the exposed face 4 of the nozzle plate, is usually very carefully dimensioned to provide a precise diameter or other desirable dimension to the extruded material in the form of strands, noodles or the like having a circular cross-section or in some instances a differently profiled cross-section. The upper or much more enlarged feed portion of the nozzle bore 2 is preferably of circular cross-section, not only for ease of fabrication of the bore and its liners but also to provide the most effective operation.

As the molten material emerges from the small outlet 3 at the face 4 of the die, it is immediately cooled by a suitable cooling medium, usually water, which is caused to flow or be sprayed onto the face 4, e.g. in a bath or the like. The cutting blade or blades (not shown) are preferably rotated or continuously moved at a narrow interval from the face 4 in order to granulate the emerging polymer strands as they solidify. Cooling of the die face is normally adjusted in dependency upon the throughput of the thermoplastic melt such that the outer surface of the extruded strands are sufficiently cooled and solidified to permit an advantageous and uniform cutting.

When the thermoplastic melt is adjusted to the proper temperature, it will continuously flow smoothly and without disturbance over a relatively elongated nozzle bore 3 provided that one meets the essential condition of insulating the nozzle bore 2 from the nozzle plate not only to prevent excessive cooling backward from the face of the die but also to prevent excessive heat loss from the melt flowing through the nozzle plate.

The desired improved results according to the invention are essentially achieved by employing at least two concentric tubular liners such as 5, 6 or 5,6,6' or the like as illustrated in all of the figures of the drawing, provided that the innermost liner is a metal tube 5 and provided that there is a radial clearance or annular free space between the individual liner tubes and between the outermost tube 6 or 6' and the wall of the surrounding nozzle bore 2.

This intermediate or annular space forward between the tubular liners and the space between each outer liner and the bore wall serve to receive a suitable heat insulating means. It is preferable to provide known heat insulating agents or materials, for example gases or gas mixtures or solid materials such as glass wool or asbestos. The heat insulating means can also be present in pulverized or granulated form. On the other hand, one can also flow a molten insulating material into the individual annular space surrounding the concentric liners or between each liner tube, such that the melt is pressed into or simply flows into this space and is then solidified in place. Other solid heat insulating means such as insulating tapes, asbestos fabrics or the like can also be wound or applied around individual liner tubes and serve to support and/or fix these tubes in the radial positions.

Each metal tube employed, including the essential innermost tube, have a relatively small wall thickness consistent with fabricating capabilities on the one hand and strength requirements preventing deformation or displacement of the tubes on the other hand under operating conditions. The innermost diameter is normally at least as large as the exit or outlet opening 3 at the face of the nozzle plate 1, while the outer diameter of each tube must be spaced sufficiently from the next concentric tube or nozzle bore wall to provide an insulating space or annular layer for the heat insulating means which will effectively prevent undesirable heat transfer between the melt and the nozzle plate 1.

In an especially advantageous embodiment of the invention, at least two concentrically positioned metal tubes are interconnected near each end to provide a gas-tight annular space therebetween, using a gaseous heat insulating agent in this enclosed space which is preferably under reduced pressure, i.e. at a pressure of less than one atmosphere. At somewhat higher cost, one can substantially completely evacuate this enclosed annular space so as to achieve a sealed vacuum as the heat insulating means.

A construction which is especially favorable for the assembly and disassembly of more than two metal tubes is that in which the metal tubes and their heat-insulating intermediate annular spaces are united into a single integral unit which can be easily inserted into the nozzle bore. In this instance, it is preferable to arrange all of the metal tubes of means of various similar spacing rings or flanges which accurately fix the radial positions of the individual tubes and which also fix the entire unit concentrically within the nozzle bore. The individual tubes in this unitary construction can be joined together by various means, for example by a simple force fit, by shrink fitting or by soldering, brazing, welding or the like.

Referring now to the individual embodiments, FIG. 1 illustrates a relatively simple form of the invention in which the nozzle plate 1 of the extrusion die of an underwater granulator has a number of the bores 2, each of which is provided with two concentrically arranged metal tubes 5 and 6 surrounded by a gaseous insulating layer in each instance. The inner metal tube liner 5 which is surrounded over most of its length by the second metal tube 6, exhibits at both ends a collar or radially flanged portion 7 which serves as a seating or connecting means for outer tube 6 attached thereto or inserted thereon. Between the two tubes 5 and 6 is formed the annular space 8 which is provided with an effective heat insulating material such as a gaseous insulator or various solid insulators including glass wool, asbestos or the like. It is advantageous to weld the two metal tubes into a single unit while at least partly evacuating the intermediate space 8. The lower end of the inner liner tube 5 facing the outlet portion 3 of the nozzle 2 is supported directly in sealing relationship on the transition surface or conically tapered section of the bore 2 where it narrows down to the outlet 3. While the metal tubes 5 and 6 are fixed radially by the flanges or collars 7 with respect to each other, the fixing of their axial position is achieved by using a spacing ring on the inner tube line 5, which may take the form for example of a lipped cap or washer-like element 9 supported around its entire circumference on the wall of the bore 2. The double tube construction can be readily inserted and removed upwardly from the metal nozzle plate 1, the pressure of the melt maintaining the unit tightly in place during the extrusion and granulating operation. The remaining free annular space 10 between the outer metal tube 6 and the bore wall 2 is likewise preferably provided with a heat insulating agent or material as previously described.

According to FIG. 2, the inner metal tube 5 is located concentrically within an outer insulating tube 11 composed of quartz, glass, ceramic substances or the like. Such an outer insulating liner can thus be composed of refractory materials such as fused silica, fused silicates and fused aluminum oxides, such as quartz, feldspar, corundum or the like having a silicate or aluminum oxide basis. Jena glass or other heat-resistant glass materials such as Vycor glass with a high silica content of 96 percent is also suitable. Porcelain is also capable of being used as well as other refractories, or at much greater expense, one can also employ special metals such as high alloy chromium nickel steels or austenitic steels of very low thermal conductivity as a suitable substitute for the outer liners, such materials being unsuitable as the innermost tubular liner.

In the particular embodiment of FIG. 2 having a quartz or ceramic liner 11, as especially preferred, the free annular spaces 8 and 10 are provided in each instance with a heat insulating means. In order to axially fix the positions of both tubes opposite the nozzle bore wall, the inner metal tube 5 is provided with the radial collar or flange 9' which is wedged or tightly fixed up against the bore wall 2 with an asbestos cord packing or the like. The embodiment of FIG. 2 is a special type of bore liner combination. Since the additional liner 11 of quartz or ceramic material is rigidly supported on the metal carrier in the form of the liner tube 5, the tendency toward cracking, splintering or shattering of the brittle liner 11 is practically eliminated.

According to FIG. 3, three metal tubes arranged concentrically to each other around the central axis of the cylindrical nozzle bore 2 are provided as the essential lining elements and are designated as 5, 6 and 6'. The radial play or clearance between the tubes is fixed by spacer rings or washer-like elements interposed between adjacent tubular members. The resulting free annular spaces 8, 10 and 12 formed in this manner are each provided with a heat insulating agent or material. With several nested small tubes of this construction, they are preferably connected into a unitary or integral construction member. The resulting liner unit can be arranged freely in the nozzle bore 2 or it can also be rigidly connected to the nozzle plate 1. In the latter instance, one can firmly join the liner unit to the inner wall of the wall at 13 by spot welding, soldering or otherwise cementing or joining the two elements.

According to FIGS. 4a and 4b, the inner metal tube 5 is arranged on a centering seat 3' formed by an offset shoulder just above the outlet segment 3 of the bore 2. An upper centering and supporting means is provided by a three pointed or triangular supporting member 14 shown in cross-section in FIG. 4a and in a top plan view in FIG. 4b. This type of bridging support is of particular value since very little heat transfer can occur over this support, i.e. between the melt or innermost tube and the bore wall. At the same time, this bridging support 14 can be profiled or shaped to provide an exact centering of two or more tubes in forming the free annular spaces 8 and 10 as in the preceding embodiments.

The described agents or means for an effective and superior heat insulation between the metal tube conducting the thermoplastic melt and the nozzle plate 1 are not limited to use in a nozzle plate of an underwater granulator but are also advantageous in equivalent devices for the production of a granulate by the so-called "hot-chip" method in which an air-water mixture is essentially present. The term "underwater" is thus to be considered in a very broad or general sense in view of the fact that immersion in a water bath is not essential where other cooling means for the extruded plastic are also quite useful.

The innermost tube 5 of the combination according to the invention is most advantageously formed of a relatively inexpensive steel or steel alloy, e.g. those steels having a high thermal conductivity well above 15 kcal./m.hr.°C. This higher thermal conductivity surprisingly is in no way disadvantageous provided that one employs the required combination of two or more tubular liners with at least one annular space constituting a heat insulating means. It will of course be understood that one can interpose or radially space a second or even a third or fourth tube composed of a thermally insulating substance as the outer or outermost tubes, e.g. as required for the single liner disclosed in the earlier U.S. Pat. No. 3,516,120. The present invention provides a very distinct improvement over such a single, brittle liner, not only in reliable and trouble-free extrusion operation but especially in cleaning the apparatus and restarting the extrusion process. Moreover, an inexpensive steel innermost tube is easy to fabricate and is relatively resistant to abrasion while remaining inert and insensitive with respect to thermal, mechanical and chemical conditions which may otherwise prove harmful. Moreover, certain embodiments of the invention have proven to be especially valuable in providing the utmost effective insulating effect, especially in combining a plurality of heat insulating layers which may include the use of quartz or ceramic tubes as part of the construction. Likewise, a unitary insert composed of two or more interconnected and concentrically nested tubes are of particular value in permitting easy assembly and disassembly of the nozzle plate while always ensuring the proper location and seating of the tubes in the nozzle bores.

The invention is hereby claimed as follows:

1. In an extrusion die for an underwater granulator having a nozzle plate at the face of the die containing a plurality of elongated extrusion nozzle bores for conducting a hot molten thermoplastic material to be extruded at the die face into a cooling liquid and to be granulated by cutting means arranged close to the die face, the improvement which comprises:
   at least two essentially concentrical tubular liners mounted within each of said nozzle bores and arranged in a fixed axial position with radial clearance between each other and the wall of the nozzle bore, at least the innermost of said liners being a metal tube; and
   heat insulating means enclosed between at least the outermost tubular liner and the wall of each nozzle bore.

2. An extrusion die as claimed in claim 1 wherein additional heating insulating means are located between individual tubular liners.

3. An extrusion die as claimed in claim 1 wherein the innermost tubular liner composed of metal is seated as an annular offset portion of the nozzle bore near the outlet end thereof at the face of the die.

4. An extrusion die as claimed in claim 1 wherein the tubular liners are supported by at least one bridging means having a plurality of radially extending arms.

5. An extrusion die as claimed in claim 1 wherein annular collar means support and radially position the tubular liners in their concentric positions.

6. An extrusion die as claimed in claim 1 wherein a plurality of metal tubes are interconnected near their ends to provide a free gas-tight annular space between each pair of tubes.

7. An extrusion die as claimed in claim 6 wherein said gas-tight annular space is at least partially evacuated to provide a reduced pressure therein.

8. An extrusion die as claimed in claim 1 wherein a profiled bridging member with three radially extended arms is mounted within the nozzle bore to radially position all of said tubular liners.

9. An extrusion die as claimed in claim 8 wherein said radially extended arms are in point contact with the inner wall of the nozzle bore to prevent substantial heat transfer over said bridging member.

10. An extrusion die as claimed in claim 1 wherein the tubular liners are lockable in their radial and axial positions by means of a plurality of spacing rings on at least one of said tubular liners.

11. An extrusion die as claimed in claim 10 wherein at least one spacing ring at the feed side of the liner assembly is constructed as a sealing gasket.

12. An extrusion die as claimed in claim 1 wherein said heat insulating means is a solid material having a low value of thermal conductivity.

13. An extrusion die as claimed in claim 12 wherein said insulating material is glass wool or asbestos.

14. An extrusion die as claimed in claim 1 wherein the heat insulating means is a gas or gas mixture.

15. An extrusion die as claimed in claim 14 wherein said gas or gas mixture is maintained under reduced pressure of less than one atmosphere.

16. An extrusion die as claimed in claim 1 wherein at least the innermost tubular liner is made of steel.

17. An extrusion die as claimed in claim 16 wherein all of the tubular liners are constructed as an integrally connected unit composed of steel for removable insertion into said nozzle bore with means to seat said unit concentrically on the bore axis.

* * * * *

PO-1050
(5/69)

UNITED STATES PATENT OFFICE
CERTIFICATE OF CORRECTION

Patent No. 3,749,536　　　　　　　　Dated July 31, 1973

Inventor(s) Horst Pawel and Friedrich Rüppel

It is certified that error appears in the above-identified patent and that said Letters Patent are hereby corrected as shown below:

First page, top of left-hand column, "Remscheid et al." should read -- Pawel et al. --.

First page, left-hand column, third to fifth lines, "Horst Pawel Remscheid, Friedrich Ruppel, both of Wuppertal-Langerfeld, Germany" should read -- Horst Pawel, Remscheid; Friedrich Ruppel, Wuppertal-Langerfeld, both of Germany --.

Column 4, line 52, "of means of" should read -- by means of --.

Signed and sealed this 27th day of November 1973.

(SEAL)
Attest:

EDWARD M. FLETCHER, JR.　　　　　　RENE D. TEGTMEYER
Attesting Officer　　　　　　　　　Acting Commissioner of Patents